No. 863,841.

PATENTED AUG. 20, 1907.

J. R. GEORGE.
CONVEYER FOR METAL RODS.
APPLICATION FILED FEB. 18, 1905.

Witnesses
Roy D. Tolman
Penelope Comberbach

Inventor
Jerome R. George
By Rufus B. Fowler
Attorney

UNITED STATES PATENT OFFICE.

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CONVEYER FOR METAL RODS.

No. 863,841.

Specification of Letters Patent.

Patented Aug. 20, 1907.

Application filed February 18, 1905. Serial No. 246,220.

*To all whom it may concern:*

Be it known that I, JEROME R. GEORGE, a citizen of the United States, residing at Worcester, in the county of Worcester and Commonwealth of Massachusetts, have invented a new and useful Improvement in Conveyers for Metal Rods, of which the following is a specification, accompanied by drawings forming a part of the same, in which—

Figure 1:
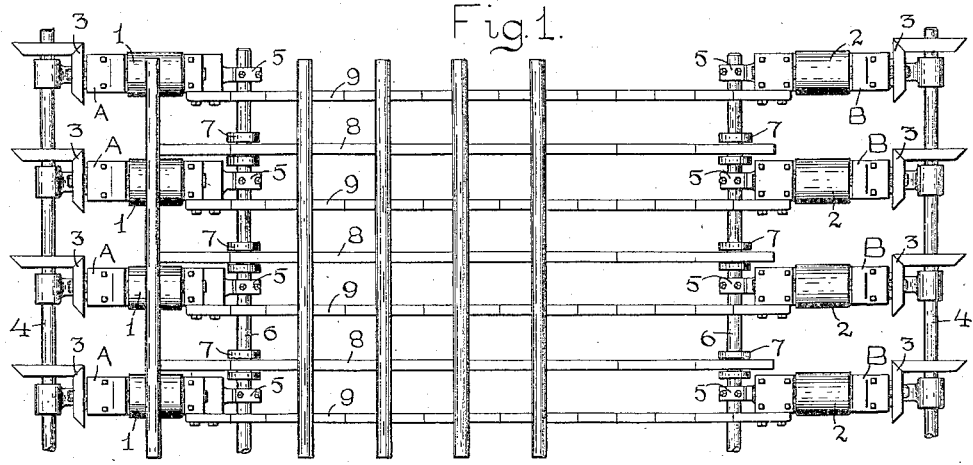
Figure 2:
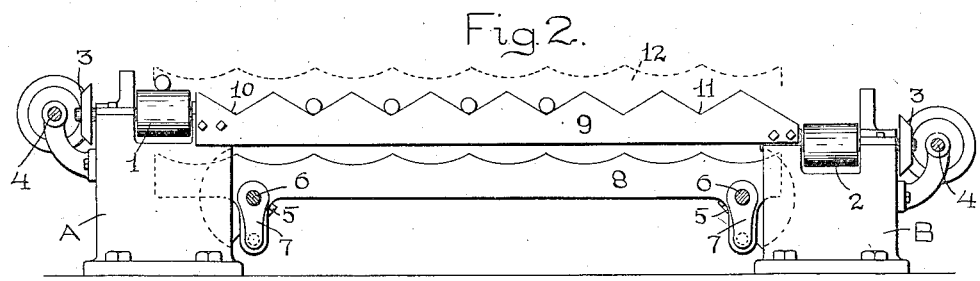

Figure 1 is a plan view of a conveyer embodying my invention, and Fig. 2 is a side view of the same, showing the lifting bars in solid lines at the lowest point in their movement and in broken lines at the highest point in their movement.

Similar reference letters and figures refer to similar parts in the different views.

My invention relates to that class of conveyers which comprises supporting bars for supporting the metal rods during a forward step-by-step movement, and a series of lifting and carrying bars by which the rods are moved; and it relates particularly to the form of the supporting and lifting bars by which the heated metal rods are held in contact and automatically straightened while in transit from one end of the conveyer to the other.

Referring to the accompanying drawings A, B, denote the supporting stands of the conveyer in which are journaled conveyer rolls 1 and 2 which are connected by gears 3 with driving shafts 4. Journaled in brackets 5 in the stands A and B are shafts 6 provided with cranks 7 which carry the lifting bars 8 and on the rotation of the shafts 6 impart a circular lifting movement to the bars 8. The supporting bars 9 are rigidly attached to the stands A and B.

In conveyers of this class as now used the upper surface of both lifting and supporting bars are straight and in horizontal planes, and the metal rods which are being conveyed sometimes come in contact with each other which is likely to distort their shape. When the supporting bars have straight supporting surfaces there is no means to correct any lateral bends which the heated rods may receive.

In my improved conveyer I make the upper surface of the supporting bars 9 of a serrate form, with the sides of the notches between the serrations less than a right angle with a vertical line passing through the points of said notches. These notches extend in sets transversely across the conveyer, with the angular sides of each set in the same plane so the weight of a rod when in a plastic state will be sufficient to straighten the rod as it rests in the angle of the notches. The lifting bars 8 I make wave shape, with the crests of the waves so arranged below the supporting bars 9 that when the lifting bars have passed through one quarter of their circular movement the depressions in the lifting bars will correspond with the notches in the supporting bars, and as the upward movement continues, the lifting bars will raise the metal rod from the supporting bars, with the rods supported at the lowest point of the curved sides of the lifting bars. At a three quarter revolution of the lifting bars the metal rods will have been carried over the serrations of the supporting bars and advanced a distance equal to one serration and deposited in the notches of the supporting bars. The circular movement of the lifting bars 8 serves to lift the metal rod just received by the conveyer rolls 1 and start it toward the rolls 2 by placing it in the first set of notches 10, and also to lift the rod from the last set of notches 11 and transfer it to the conveyer rolls 2. The position of the lifting bars at the limit of their upward movement is shown by the broken lines 12, Fig. 2. By the serrate form of the supporting bars and the wave shape of the lifting bars 8 each rod in the conveyer remains constantly separated from its companions by an equal interval, so that all contact of the metal rods with each other is prevented. The angular form of the notches on the supporting bars and their arrangement in parallel sets across the conveyer with their corresponding sides in the same plane serves the purpose of correcting any bends or distortions in the rods themselves, as the weight of the heated rods in their plastic state is sufficient to produce a change in their direction until they bear against the angular sides of the notches. The support afforded by the angular sides of the notches tends to straighten the rods until the straight form of the rods has become permanent by their cooling.

The wave shape of the lifting bars 8 causes the rods to be held in position to be lowered into the center of the notches of the supporting bars, as the curvature is sufficient to cause the rods to roll toward the center of the curve, but I do not wish to confine myself to the curved form of the supporting surfaces of the lifting bars as the desired result may be accomplished by other forms.

What I claim as my invention and desire to secure by Letters Patent is:—

1. In a conveyer for metal rods, the combination of supporting bars having serrated upper edges, lifting bars normally entirely below said serrated upper edges of said supporting bars, and means for moving said lifting bars in a circle, whereby the upper surface of said lifting bars passes entirely above the serrated upper edges of the supporting bars.

2. In a conveyer for metal rods, the combination of supporting bars provided with angular notches arranged in sets transversely across the conveyer, each set with the sides of the notches in the same plane and each set of notches arranged to support a metal rod, and means for lifting metal rods from out of each set of angular notches and over the serrations separating said notches and depositing each rod in an adjacent set of notches.

3. In a conveyer for metal rods, the combination with supporting bars provided with angular notches arranged in sets transversely across the conveyer, each set with the sides of the notches in the same plane, of lifting bars provided with successive depressions also forming sets, each set arranged to receive the metal rod lying in a single set of angular notches and lift it over the serrations separating the adjacent sets of said notches, and means for actuating said lifting bars.

4. In a conveyer for metal rods, the combination of supporting bars provided with depressions arranged in sets transversely across the conveyer, lifting bars provided with corresponding depressions, so arranged that when the lifting bar is at its lowest position the depressions in said lifting bars are approximately below the serrations between the depressions in the supporting bars, and means for imparting a circular movement to said lifting bars.

5. In a conveyer for metal rods, the combination of supporting bars provided with depressions arranged in sets transversely across the conveyer, lifting bars provided with depressions, said lifting bars so arranged that when said lifting bars have been moved upward one quarter of a circle, the depressions in said lifting bars correspond with depressions in the supporting bars, and means for imparting a circular movement to said lifting bars.

6. In a conveyer for metal rods, the combination of supporting bars provided with angular notches, lifting bars provided with curved depressions, and means for actuating said lifting bars.

7. In a conveyer for metal rods, the combination of fixed supporting bars provided with a series of notches arranged in sets transversely across the conveyer, with the sides of said notches in each set in the same plane, a series of movable notched bars, and means for actuating said movable bars to lift a metal rod from one set of notches in said fixed bars and deposit it in another set of notches.

Dated this 15th day of February, 1905.

JEROME R. GEORGE.

Witnesses:
RUFUS B. FOWLER,
PENELOPE COMBERBACH.